United States Patent [19]

Meyer et al.

[11] Patent Number: 4,977,190
[45] Date of Patent: Dec. 11, 1990

[54] PREPARATION OF RIBOFLAVIN, PRODUCED BY A MICROBIAL METHOD, IN THE FORM OF SPRAY-DRIED GRANULES OR MICROGRANULES

[75] Inventors: Joachim Meyer, Hessheim; Wolfgang Buehler, Hockenheim; Johannes Grimmer; Gunter Eipper, both of Ludwigshafen; Hans Kiefer, Wachenheim; Christoph Martin, Mannheim, all of Fed. Rep. of Germany

[73] Assignee: BASF Aktiengesellschaft, Ludwigshafen, Fed. Rep. of Germany

[21] Appl. No.: 363,853

[22] Filed: Jun. 9, 1989

[30] Foreign Application Priority Data

Jun. 10, 1988 [DE] Fed. Rep. of Germany ....... 3819745

[51] Int. Cl.$^5$ ............................................ C07D 471/00
[52] U.S. Cl. ...................................... 514/951; 544/251
[58] Field of Search .......................... 544/251; 514/951

[56] References Cited
U.S. PATENT DOCUMENTS
3,959,472 5/1976 Cannalonga ......................... 514/951

FOREIGN PATENT DOCUMENTS
0121877 10/1984 European Pat. Off. .
0211289 2/1987 European Pat. Off. .
0231605 8/1987 European Pat. Off. .
2920592 12/1980 Fed. Rep. of Germany .
3344509 6/1984 Fed. Rep. of Germany .
3420310 4/1985 Fed. Rep. of Germany .

OTHER PUBLICATIONS

Kroll, Trocknungstechnik, BD. II: "Trockner und Trocknungsverfahren", 2. Ed., Springer Verlag, Berlin 1978, pp. 221–224.

Primary Examiner—Mukund J. Shah
Assistant Examiner—C. L. Cseh
Attorney, Agent, or Firm—Oblon, Spivak, McClelland, Maier & Neustadt

[57] ABSTRACT

Riboflavin produced by a microbial method is prepared in the form of free-flowing, non-dusting, spray-dried granules or microgranules as a feed additive by removing water from the mixture discharged from microbial fermentation for the preparation of riboflavin, wherein the mixture is subjected to (a) a fluidized-bed spray-drying process
(b) a one-material spray-drying process or
(c) a disk spray-drying process without significant amounts of binders being added to the discharged fermentation mixture.

5 Claims, No Drawings

PREPARATION OF RIBOFLAVIN, PRODUCED BY A MICROBIAL METHOD, IN THE FORM OF SPRAY-DRIED GRANULES OR MICROGRANULES

The present invention relates to a process for the preparation of riboflavin, produced by a microbial method, in the form of spray-dried granules or microgranules as a feed additive by removing water from the mixture discharged from microbial fermentation by a spray-drying method.

The preparation of riboflavin by microbial fermentation processes is disclosed in, for example, EP-A-231 605, EP-A-211 289 and German Laid-Open Application DOS 3,420,310. The riboflavin produced industrially by this method serves as a feed additive. The end product of the production of riboflavin by fermentation is generally isolated together with the biomass in the form of a riboflavin concentrate by evaporating down the resulting culture liquid. Unfortunately, the products obtained in this manner have serious disadvantages in some cases. For example, they have poor flow, which in practice, owing to bridge formation, may result in storage silos being emptied insufficiently, if at all, and hence in the accuracy of metering being adversely affected. Furthermore, they have only a low bulk density. This leads in practice to high packaging, storage and transport costs. In particular, however, the known products give rise to large amounts of dust and become charged, resulting in handling difficulties during mixing to give premixes and feeds. Spray-drying of the fermentation product by means of a two-material nozzle is also known, but the spray-dried products obtained by this method also do not completely meet all requirements with regard to performance characteristics. For example, when mixed into water for the preparation of liquid feed, they tend to form lumps. The lumps formed are difficult to break up again.

It is an object of the present invention to provide a formulation process for riboflavin produced by microbial fermentation, which process gives free-flowing, non-dusting spray-dried granules or microgranules which do not have the difficulties described during preparation of premixes or feeds.

We have found that this object is achieved and that, surprisingly, free-flowing, non-dusting riboflavin-containing spray-dried granules or microgranules which are easy to handle are obtained if the mixture discharged from microbial fermentation is spray-dried in a very particular manner, even without the addition of binders.

The present invention accordingly relates to a process for the preparation of riboflavin, produced by a microbial method, in the form of free-flowing, nondusting, spray-dried granules and microgranules as a feed additive by removing water from the mixture discharged from microbial fermentation for the preparation of riboflavin, wherein the mixture discharged from the fermentation is subjected to
(a) fluidized-bed spray-drying process,
(b) a one-material spray-drying process or
(c) a disk spray-drying process
without significant amounts of binders being added to the mixture discharged from the fermentation.

Surprisingly, riboflavin granules prepared in this manner have advantages, in some cases considerable ones, over the known and commercial products with regard to performance characteristics.

For the preparation of spray-dried granules or microgranules, the fermentation broth obtained in the preparation of riboflavin by fermentation can be used as such or in concentrated from. The fermentation broth is understood as being the mixture discharged from a fermentation, which can be carried out in a known manner (cf. EP-A 211 289, EP-A 231 605, German Laid-Open Application DOC 3,420,310 or Genevieve C. Barrerc in Biochemistry and Genetics of Vitamin Production, Nato Advanced Study Institute Series, Series A, 87 (1985), 141–169, in particular 150–158). The medium for the fermentation contains carbon sources, such as carbohydrates, organic acids, alcohols or fats, and nitrogen sources, such as protein-containing meals, peptones, amino acids, urea or inorganic nitrogen salts. Sulfates, phosphates, carbonates or nitrates of magnesium, potassium, sodium, calcium or manganese and even vitamins may also be used in the fermentation medium.

The concentration of riboflavin in the fermentation broth can be increased by filtration or centrifuging and decanting (cf. DE 29 20 592).

In contrast to the known spray-drying of the mixture discharged from the fermentation, in which this mixture is usually sprayed into a drying tower by means of a two-material nozzle, in the fluidized-bed spray-drying process used according to the invention the suspension is sprayed continuously or batchwise into a fluidized bed of dry reaction product. The drying means is provided with suitable apparatuses which make it possible to obtain a certain particle size fraction and to maintain the granulation process (cf. K. Kröll Trocknungstechnik, Volume II Trockner und Trocknungsverfahren, 2nd Edition, Springer-Verlang, Berlin, 1978, pages 221–223).

In general, to carry out the fluidized-bed spray-drying of the mixture discharged from the fermentation,
(a) riboflavin in the form of a dry powder, spray-dried granules or microgranules is initially taken in a fluidized-bed drier in a fluidized bed kept at 20°–150° C., preferably 50°–100° C.,
(b) the fermentation mixture obtained is added in atomized form, if necessary after concentration of riboflavin by decantation, at the rate at which drying takes place,
(c) the riboflavin particles are removed from the fluidized bed after a suitable residence time and separated into particle fractions by a suitable apparatus,
(d) the particle fraction having a particle size of from about 100 to 200 μm is separated off and
(e) the finer particles and/or the fine particles obtained by milling of larger particles are recycled to the granulation process.

The fluidized-bed spray-drying process can be carried out batchwise or by continuous procedure, the continuous procedure being particularly advantageous.

To carry out the process, it is first necessary to convert dry riboflavin powder corresponding to the prior art into a riboflavin product with which a fluidized bed can be produced. In the batchwise process, a relatively finely divided product can be initially taken in the fluidized bed. Depending on the residence time of the particles in the fluidized-bed drier, a dry product having a smaller or larger particle size range is then obtained. Particles in the size range of about 100 to 250 μm have the desired handling properties and are therefore recovered as the desired product. Smaller particles and riboflavin product obtained by suitable milling of larger particles are used as fluidized bed material for further batches.

To carry out the continuous process, the mixture discharged from the fermentation is sprayed continuously, preferably after concentration of riboflavin by decantation, into a fluidized bed consisting of a dry riboflavin product. The spraying speed is adjusted so that the fluidized bed is at a temperature corresponding to the desired degree of drying. Accordingly, this is finally determined from the difference between the inlet temperature and outlet temperature of the fluidizing gas.

In the continuous process, finely divided riboflavin is used as a starting material only when the fluidized-bed drier is started up for the first time. Thereafter, a dry product of virtually constant particle size ratio is obtained. A certain part of this product is removed continuously and separated into particle size fractions. The fraction having a particle size of from 100 to 250 μm is separated off as the desired product, and the fine particles and/or the fine particles obtained by milling of larger particles are recycled continuously to the fluidized bed to maintain the granulation process. In each case, roughly the amount of riboflavin removed as the desired product is sprayed continuously into the fluidized bed, in the form of the discharged fermentation mixture to be dried.

The fluidizing gas used to form the fluidized bed generally has an inlet temperature of from 80° to 250° C., preferably from 140° to 185° C., and an outlet temperature of from 40° to 140° C., preferably from 60° to 85° C., resulting in temperatures of about 20°–150° C., preferably 50°–100° C., in the fluidized bed.

When the novel fluidized-bed spray-drying process is carried out, the following particle size fractions are generally obtained:
1. about 6–30% in the particle size range up to 100 μm
2. about 25–85% in the particle size range of 100–250 μm
3. about 1–70% in the particle size range of 250–400 μm.

To carry out the novel one-material spray-drying of discharged fermentation mixture, a one-material hollow-cone nozzle, as available, for example, from Delawan under the name SDX Standard, is generally used. However, hollow-cone nozzles from Lechler, Schlick and Lurgi and hollow-cone nozzles according to EP-A2 0 121 877 can also be used. The atomization energy is generated here by the pressure from a pump which feeds the liquid to be dried to the one-material hollow-cone nozzle. The pressure required for atomization can be up to 80 bar absolute, but pressures of only from 15 to 25 bar absolute are preferably used. The solid content of the liquid to be dried may be up to 45, preferably from 15 to 30%, by weight.

The material to be dried is introduced by means of the one-material hollow-cone nozzle described into a heated drying tower, dried there and discharged from the lower end of the tower. The drying tower inlet temperature of the drying gas is in general about 100°–200° C., preferably 130°–170° C., and the residence time is in general about 20–40 seconds. To obtain a non-dusting vitamin $B_2$ microgranule fraction, the dry material obtained in the drying tower must be fed to a suitable separating apparatus. The drying tower discharge cone may be in the form of a separating apparatus, as described in, for example, German Patent No. 3,344,509. In this separating apparatus, the non-dusting microgranules are separated off as the useful fraction while the smaller particles (<20 μm) leave the drying tower with the drying gas. This fine material is separated from the gas stream in downstream separators (cyclones, filters) and can be mixed with the discharged fermentation mixture to be dried (recycling). The proportion of the dust-forming fine fraction is dependent on the solids content of the discharged fermentation mixture fed to the hollow-cone nozzle and on the nozzle admission pressure. The fine fraction may amount to about 5–40%. Where the discharged product has a solids content of about 25–30% and the nozzle admission pressure is about 15 bar, the fine fraction to be recycled is only about 5–10%.

The product obtained in this manner has a particle size of from 30 to 200 μm.

The microgranules obtained in this manner also have excellent handling properties.

Microgranules which, after removal of the fine fraction (<20 μm) as described above, have very good handling properties can also be obtained by disk spray-drying of the discharged fermentation mixture, even without the addition of significant amounts of binders.

The riboflavin spray-dried granules or microgranule prepared by the novel process surprisingly have considerable advantages over the conventional and commercial dry powders with regard to performance characteristics.

EXAMPLE 1

In a fluidized-bed drier, from 0.9 to 1 kg/hour of an aqueous suspension (fermenter discharge concentrated by decantation), consisting of 78 parts of water and 22 parts of solids (containing 73.1% of riboflavin according to HPLC) and at 20° C., was sprayed continuously by means of a two-material nozzle into a fluidized bed consisting of 96% strength riboflavin having a mean particle size of 0.12 mm. The fluidizing gas had an inlet temperature of from 140° to 150° C. The amount sprayed in was such that the resulting temperature of the fluidized bed was from 75° to 80° C. The initially taken fluidized bed was changed five times in the course of about 25 hours and the product formed was removed. After this time, the initially taken riboflavin had been virtually completely removed from the drying process, and the product contained in the fluidized bed was composed of 73.1% of riboflavin and 26.9% of biomass and had the particle size distribution described below. A part of the initially taken fluidized bed was removed continuously and was separated into 3 particle fractions by screening means. This gave
(1) 38% of a product having a particle size of <100 μm
(2) 54.5% of the desired product, having a particle size of from 100 to 250 μm
(3) 7.5% of a product having a particle size of >250 μm.

The coarse fraction (3) was milled to a particle size of <250 μm and then recycled continuously to the fluidized bed, together with the fine fraction (1).

The amount of desired product obtained per hour (h) was from 0.2 to 0.27 kg/h.

EXAMPLE 2

In a fluidized-bed drier, from 0.75 to 0.8 kg/h of an aqueous suspension (fermenter discharge concentrated by decantation), consisting of about 80.3% of water and 19.7% of solids (containing about 63.9% of riboflavin according to HPLC) and at 20° C., was sprayed continuously by means of a two-material nozzle into a fluidized bed consisting of riboflavin having roughly the same composition. The fluidizing gas had an inlet temperature of from 140° to 150° C. The amount sprayed in was such that the resulting temperature of the fluidized bed was about 75° C.

A part of the initially taken fluidized bed was removed continuously and was separated into 3 particle fractions by screening means.

This gave
(45.6% of a product having a particle size of <100 μm
(2) 50.2% of the desired product having a particle size of from 100 to 250 μm
(3) 4.2% of a product having a particle size of >250 μm.

The coarse fraction (3) was milled to a particle size of <250 μm and then recycled continuously to the fluidized bed together with the fine fraction (1).

About 0.15 kg of spray-dried riboflavin granules per h was obtained.

In the Table below, the essential performance characteristics of the riboflavin product obtained in Examples 1 and 2 are compared with those of conventional commercial products.

(3) 67% of a product having a particle size of >250 μm.

The coarse fraction (3) was milled to a particle size of <250 μm and then recycled continuously to the fluidized bed, together with the fine fraction (1).

About 24.5 kg/h of the desired spray-dried riboflavin granules (particle size of from 100 to 250 μm) were obtained.

EXAMPLE 4

In a fluidized-bed drier, 0.95 kg/h of a fermenter discharge which was not concentrated and consisted of 86% of water and 14% of solids were sprayed into a fluidized bed of riboflavin. The fluidizing gas had an inlet temperature of from 160 ° to 170° C. The amount sprayed in was such that the resulting temperature of the fluidized bed was from 78° to 80° C.

From 0.1 to 0.12 kg/h of spray-dried riboflavin granules having the desired particle size of from 100 to 250 μm was obtained similarly to Example 1.

We claim:

1. A process for preparation of riboflavin, produced by a microbial method, in the form of free-flowing, non-dusting, spray-dried granules or microgranules, comprising removing water from the mixture discharged from a microbial fermentation for the preparation of riboflavin, wherein the mixture discharged from the fermentation is subjected to a drying process selected from the group consisting of a fluidized-bed spray-drying process, a one-material spray-drying process, and a disk spray-drying process, in the absence of significant amounts of binders being added to the mixture discharged from the fermentation.

| Riboflavin [prepared according to Example] | Performance characteristics | | | | | | | |
|---|---|---|---|---|---|---|---|---|
| | Flow behavior | | Dust test [o/15/30 sec] | Mean particle size [mm] | Particles [mio/g] | Bulk density [g/cm³] | Color | Odor |
| | Flow angle [degrees] | Flow [mm] | | | | | | |
| Example 1 | 30 | 4 | 5/3/1 | 0.21 | 0.21 | 0.55 | Yellowish brown | Slight odor of yeast |
| Example 2 | 32 | 4 | 5/2/1 | 0.14 | 0.70 | 0.49 | Yellowish brown | Slight oder of yeast |
| Riboflavin feed* 62% strength (BASF) | 55 | 24 | 60/22/15 | 0.04 | 29.9 | 0.32 | Yellow | Intense odor of fermenter residue |
| Riboflavin feed* 80% (Hoffmann-La Roche) | 31 | 5 | 24/14/8 | 0.06 | 8.8 | 0.41 | Orange-brown | Slightly musty |

*Prepared by spray-drying using a two-material nozzle

EXAMPLE 3

In a fluidized-bed drier, about 100 kg/h of a fermenter discharge concentrated by decanting, consisting of 76% of water and 24% of solids (containing 70.8% of riboflavin) and at 20° C., were sprayed continuously by means of a two-material nozzle into a fluidized bed consisting of riboflavin having roughly the same composition. The inlet temperature of the fluidizing gas was 170° C. The amount sprayed in was such that the resulting temperature of the fluidized bed was from 71° to 72° C.

A part of the initially taken fluidized bed was removed continuously and separated continuously into 3 particle fractions by screening means. The dry product obtained had the following particle size distribution:
(1) 5% of a product having a particle size of <100 μm
(2) 28% of the desired product having a particle size of from 100 to 250 μm 2. A process as claimed in claim 1, wherein said drying process is fluidized-bed spray-drying process and wherein (i) riboflavin in the form of a dry powder, spray-dried granules or microgranules is used in a fluidized-bed drier as a fluidized bed at 20°–150° C.;

(ii) said mixture discharged from the fermentation is added in atomized form to said fluidized-bed drier at the rate at which drying takes place, to produced riboflavin particles;

(iii) said riboflavin particles are removed from the fluidized bed after a residence time sufficient to form particles having a particle size of from about 100 to 250 μm and separated into particle fractions;

(iv) the particle fraction having a particle size of from about 100 to 250 μm is removed; and (v) the particles having a particle size finer than 100 μm and/or fine particles obtained by milling of larger particles are recycled to the granulation process.

3. A process as claimed in claim 2, wherein, to carry out the fluidized-bed spray drying by continuous procedure, a fluidized bed kept at from 50° to 100° C. and consisting of riboflavin spray-dried granules or microgranules is used, a part of the resulting dried product is removed continuously from the initially taken fluidized bed and is separated into particle fractions, the particle fraction having a particle size of about 100–250 μm is separated off as the desired product and the fine particles and/or the fine particles obtained by milling of larger particles are recycled to the fluidized bed in order to maintain the granulation process.

4. A process as claimed in claim 3, wherein a fluidized bed kept at from 60° to 80° C. and consisting of riboflavin spray-dried granules or microgranules is used.

5. A process as claimed in claim 1 for the preparation of microgranules, wherein, to carry out the one material spray-drying, the discharged fermentation mixture is sprayed, under from 5 to 80 bar (absolute), by means of a one-material hollow-cone nozzle into a suitable drying tower.

* * * * *